United States Patent

Nelson

[15] 3,650,145
[45] *Mar. 21, 1972

[54] METHOD AND APPARATUS FOR TESTING HERMETICALLY-SEALED CONTAINERS

[72] Inventor: Lloyd A. Nelson, Fremont, Mich.

[73] Assignee: Gerber Products Company, Fremont, Mich.

[ * ] Notice: The portion of the term of this patent subsequent to May 26, 1987, has been disclaimed.

[22] Filed: Feb. 5, 1970

[21] Appl. No.: 8,906

Related U.S. Application Data

[63] Continuation-in-part of Ser. No. 694,444, Dec. 29, 1967, Pat. No. 3,513,689.

[52] U.S. Cl....................................................73/37, 73/49.3
[51] Int. Cl. .......................................................G01m 3/02
[58] Field of Search....................73/37, 45.4, 49.3, 41, 45.1, 73/45.2

[56] References Cited

UNITED STATES PATENTS

| | | | |
|---|---|---|---|
| 1,825,744 | 10/1931 | Landrum | 73/49.3 |
| 2,383,936 | 9/1945 | Hohl | 73/49.3 |
| 2,985,008 | 5/1961 | Renard | 73/45.2 |
| 3,513,689 | 5/1970 | Nelson | 73/37 |

Primary Examiner—Louis R. Prince
Assistant Examiner—William A. Henry, II
Attorney—Townsend and Townsend

[57] ABSTRACT

A method for automatically detecting unsatisfactorily sealed containers including sequentially receiving, externally pressure modifying and subsequently testing hermetically sealed containers traveling along a conveyed path. The method includes the detection of any impulse that may be emitted as a result of cover diaphragm movement in those container(s) having insufficient vacuum. When such an audible emission occurs, the containers are rejected. The disclosure is also directed to apparatus for accomplishing this method.

15 Claims, 2 Drawing Figures

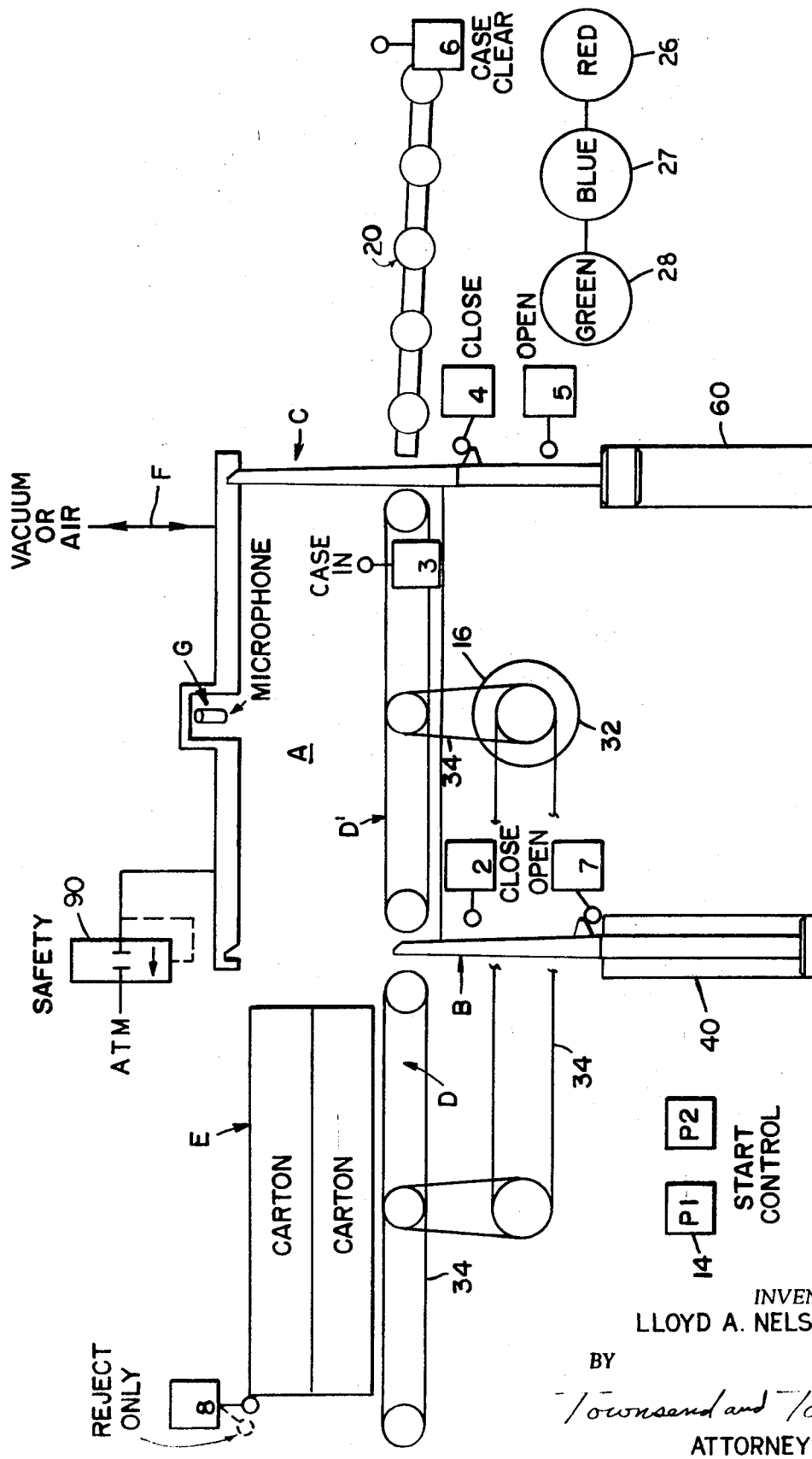

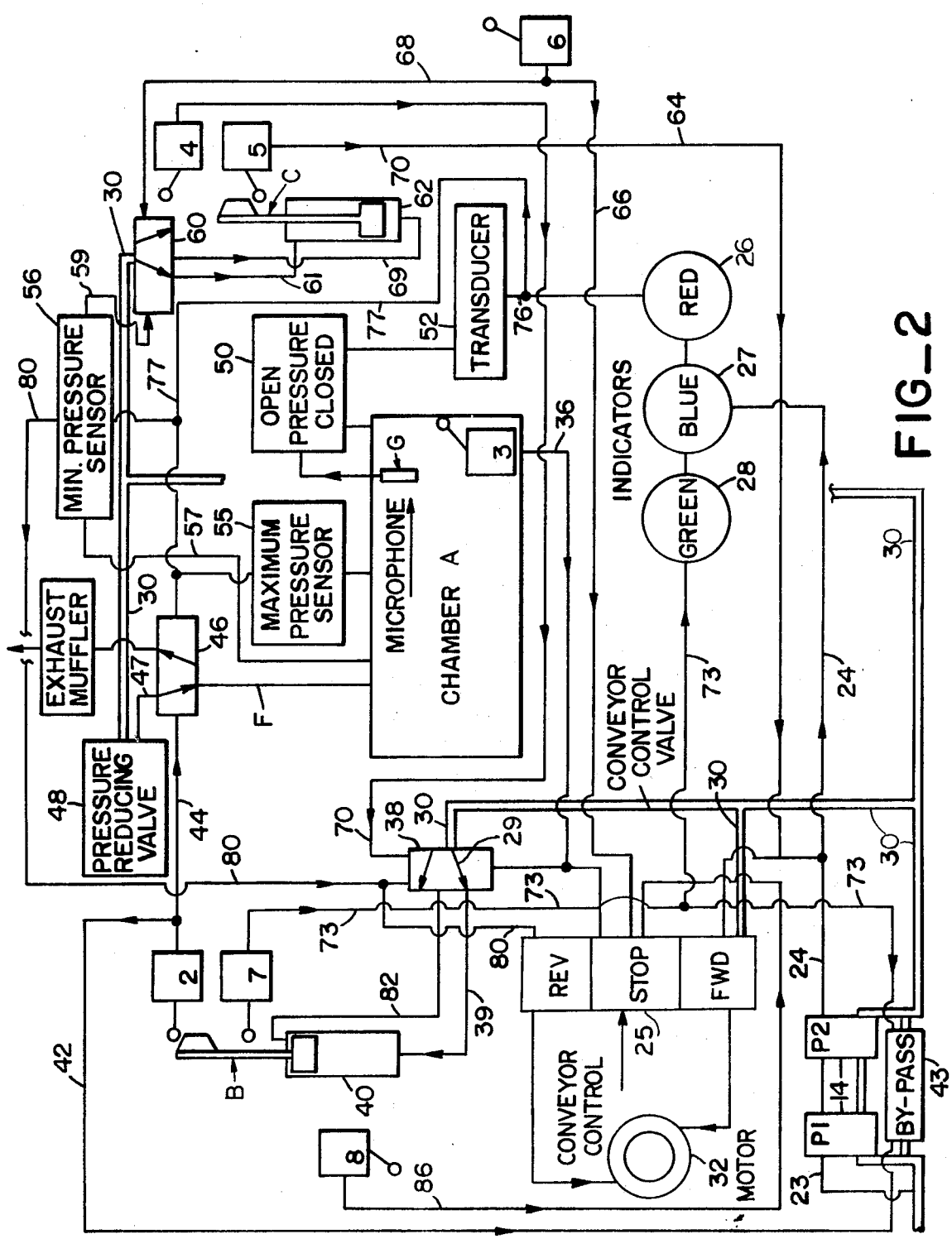
FIG_2

METHOD AND APPARATUS FOR TESTING HERMETICALLY-SEALED CONTAINERS

This application is a continuation-in-part application of the copending patent application bearing Ser. No. 694,444, filed Dec. 29, 1967, now U.S. Pat. No. 3,513,689, entitled "Method and Apparatus for Detecting Dud Containers."

This invention relates to the nondestructive detection of filled, hermetically sealed containers, having insufficient internal vacuum resulting from instances of imperfect sealing of the container. More particularly, the present invention includes a remotely actuated apparatus for automatically and rapidly detecting the presence of "dud" containers in amongst a plurality of conveyed cartons.

In the packaging of perishable products, such as baby food, reduction in the amount of oxidizing gas within the package is employed to lessen the possibility of spoilage occuring during the storage interval. In order to ensure a diminished amount of oxidizing gas within the container, i.e., that the contents of the container are under reduced pressure, such perishables are conventionally packaged at elevated temperatures. Minimizing the concentration of oxidizing gas within the head space between the top of the container contents and the closure member is accomplished by applying the closure member while the perishable contents are hot and the oxidizing gas within the container is in a greatly expanded (diluted) condition. Thereafter, when the contents of the sealed container cool down, the ultimate internal pressure will be less than atmospheric, i.e., a partial vacuum will be present within the container. Provided that the container is properly sealed, the partial vacuum will remain indefinitely. However, if the seal is defective, air will leak into the container until no pressure differential remains.

To provide for a subsequent visual observation of the continued existence of this partial vacuum, containers have been developed that include a sealing member having a flexible area (diaphragm) adapted to occupy one position (concave) when subjected to a pressure in excess of a predetermined differential, but be deflected to a second position (convex) in the absence of said predetermined differential. The design and material stresses of the diaphragm are such that deflection occurs without permanent deformation of the closure member. Such containers are exemplified by mason jars, conventional baby food jars and various types of tin cans.

Irrespective of the form of the container, the reason for having this "diaphragm" is to provide a visual means to readily determine the presence of the desired internal vacuum. Thus, where the relationship between the internal and external pressure is such that a predetermined pressure difference is present, it will cause this "diaphragm" to be drawn in, whereas the absence of this predetermined pressure difference will allow the diaphragm to spring back or occupy a normally unbiased (convex) position. Thus, the absence of an inward distortion of the center diaphragm of a filled container after processing is a visually observable indication of an unsatisfactory hermetic seal within the container. Such containers are commonly referred to as "duds." Conversely, the continued presence of the inwardly distorted center diaphragm also provides a visually observable indication of a satisfactory aseptic condition within the container. This visual aspect is especially useful to the ultimate consumer who can readily determine the aseptic condition of the container immediately prior to utilizing the contents thereof.

The above-referenced copending patent application describes a method of examination of such containers by detecting the audible impulse emitted by deflection of the diaphragm should insufficient internal vacuum be present. This is accomplished by subjecting the containers to sufficient external positive pressure to cause any improperly disposed (convex) diaphragm to be forced to the concave position with attendant detectable emission.

Briefly stated, the method of that application includes placing at least one container within a pressure chamber. The pressure in the chamber is first raised to a predetermined positive test limit and thereafter lowered back to atmospheric pressure. In such raising and lowering of the pressure interior of the chamber, the diaphragm of a container having insufficient vacuum is deflected from a convex to a concave configuration and thereafter back to a convex configuration. This produces, within the pressurized chamber, audible clicks that are detectable by a transducer such as a microphone. As the occurrence of this distinctive clicking sound alone indicates the presence of containers having insufficient vacuum, detection of insufficiently sealed or "dud" containers is possible without time consuming and laborious visual or physical inspection of the food containers.

Heretofore, testing for "dud" containers has been done merely on a random sample basis. While such sampling is a statistical indication of the presence of insufficiently sealed containers, it is preferred, especially in the food products for consumption by the very young, to test each and every container emanating from a given food processing plant. The present invention is directed in part to automation of the above-referenced container testing process by a modern high-speed conveyor system.

In such automation, several distinct problems have been encountered. First, it has been found that the listening transducer is sensitive to extraneous noises from the pressure chamber doors and case movement. Secondly, it has been found that a mere perceptible indication of the presence of a food container having insufficient vacuum is unsatisfactory as operators are susceptible to human error. Thirdly, it has been found essential to provide the test apparatus with a sequence that receives, tests and ejects cartons of encased containers rapidly to enable testing a large portion or possibly the entire output of a food processing plant.

The invention is also directed to apparatus for ensuring that any existing partial vacuum within the container be sufficient to provide the necessary storage environment. Thus, in certain instances, containers can include sufficient reduced internal pressure (partial vacuum) at the time of testing to retain the diaphragm in a biased (concave) position. However, such containers may be "leaking" slowly and ultimately exhibit insufficient vacuum to provide the protection necessary for the container contents. Where it is desired to detect such containers, application of a partial vacuum to the outside of the container corresponding to the partial vacuum desired within the container, will cause the flexible diaphragm to spring back to or occupy the normally unbiased (convex) position, thereby creating a detectable impulse. When the vacuum is released, the diaphragm returns to the concave position with an accompaning second impulse.

As hereinafter described in more detail, the apparatus of this invention can be utilized by applying either a pressure or partial vacuum (or each in sequence) to the exterior of multiple containers, with the advantage that containers having an internal vacuum either insufficient to maintain the diaphragm in the biased position or insufficient to retain the diaphragm in an unbiased position when subjected to an external vacuum, can be detected.

Accordingly, an object of this invention is to provide a method for rapidly testing groups of carton-encased, hermetically sealed containers to determine the presence of insufficient internal vacuum. Typical apparatus includes a pressure chamber provided with front and rear openings, such as doors, and a conveyor running therethrough. The conveyor transports the encased containers into the chamber. Thereafter, the doors are closed, sealing the chamber and the pressure therein sequentially modified. Only during that period after all door and carton movement has ceased is the chamber pressure varied from atmospheric, i.e., increased or decreased, and a listening transducer actuated within the chamber interior to detect any distinctive click of the manipulated cover diaphragms. When no containers having unsatisfactory vacuum are found, the internal pressure is allowed to return to atmospheric, the rear pressure chamber door is opened, and the cartons of containers are transported out of the chamber. If, however, the presence of a container with insufficient (unsatisfactory) vacuum is detected by the transducer, the tested cases of food containers are automatically diverted from their original path so that they may be further individually inspected.

A further object of this invention is to provide a method for automatically testing a plurality of hermetically sealed containers enclosed in at least one opaque shipping carton.

An advantage of this invention is that the transducer is activated only when all movement interior of the pressure chamber has ceased, thereby eliminating the possibility of any extraneous noise interfering with the signal intended to activate the rejection mechanism.

An additional advantage of the apparatus of this invention is that it provides a vessel in which the pressure can be quickly adjusted and returned to atmospheric to provide for the testing of all cases emanating from a given manufacturing facility.

A further advantage of this invention is that the rejection mechanism interrupts the normal sequence of conveyance for cases having "dud" containers detected therein, thereby eliminating the possibility of passing detected containers having insufficient vacuum.

Still another advantage of the present invention is that the testing can be accomplished without destroying or in any way damaging the opaque, sealed fiber shipping carton conventionally used for storing and shipping of groups of containers.

Other objects, features and advantages of the present invention will be more apparent after referring to the following specification and attached drawings in which:

FIG. 1 is a schematic illustration of the pressure chamber (shown in section) and attached apparatus installed within a conveyor line; and, FIG. 2 is a schematic diagram illustrating a circuit for actuating the operating sequence of the apparatus of FIG. 1.

With reference to FIG. 1, which illustrates a typical apparatus for accomplishing the process of this invention, a pneumatic detection system is illustrated including pressure chamber A (shown schematically in section) having remotely actuated front door B and rear door C. Doors B and C are tapered internally and externally so that when closed, they wedge into recesses in the respective ends of chamber A, thus sealing its interior. Doors B and C are provided with internal and external peripheral gaskets (not shown) to ensure that chamber A will be air tight whether pressure is applied or a vacuum drawn. Conveyors D and D', respectively, are arranged to advance carton encased hermetically sealed containers E into, through and out of chamber A. Cartons E are conventional gas pervious, opaque shipping cartons typically containing 24–5 oz. glass baby food jars.

Pressure interior of chamber A is (1) raised and lowered by air introduced and exhausted through air piping F from an air source (not shown), or (2) lowered by activation of a vacuum source (not shown). Microphone G, activated only when all case and door movement has ceased within the chamber, is provided to detect any distinctive clicking that may be emitted by pressure manipulation of the food container diaphragms in the event that any of the containers within cartons E have insufficient internal vacuum.

In operation, cartons E containing a plurality of glass jars are placed on conveyor D immediately outside of chamber A. Door B is in the open position and the "ready for test" indicator (here shown as green light 28) illuminated. Start controls 14, comprising a pair of independent buttons P1 and P2, are then depressed. This pair of buttons must be simultaneously depressed, thereby inhibiting possible hand injury to the operator. It will be apparent to one skilled in this art that where safety is not a primary consideration, only one starter button need be included.

When start controls 14 are depressed, conveyor motor 16 is actuated thereby advancing conveyors D and D' and causing cartons E to move forwardly and inwardly interior of chamber A. Simultaneously, "test in progress" visual indicator (here shown as blue light 22) is illuminated.

When cartons E have fully entered chamber A, limit valve 3 is activated stopping conveyor motor 16 and closing door B by activating cylinder 40. Thereafter, chamber A is subjected to the prescribed internal pressure or partial vacuum by introducing or removing air through conduit F. Once the pressure (or vacuum) interior of the chamber reaches the desired predetermined test limit, it is allowed to discharge.

Simultaneously with adjusting of the pressure within chamber A, microphone G is actuated. This microphone and related transducer are arranged to detect sonic impulses emanating as a result of the pressure manipulation of cover diaphragms of those carton encased food containers that may have insufficient vacuum therein.

In the event that the presence of a container having insufficient vacuum is detected, whether during the pressure or vacuum cycle, dud container visual indicator (here shown as red light 26) is illuminated and the non-atmospheric condition within the chamber immediately released. Door B is then opened and conveyor motor 16 reversed so that cases E are returned to the operator in the position indicated in FIG. 1.

Assuming that all containers in cartons E have sufficient vacuum, the pressure (or vacuum) within chamber A is released, i.e., allowed to return to a level near atmospheric, and the connection between microphone G and its associated transducer is interrupted. Thereafter, rear door C is opened, conveyor D' actuated in the forward direction to convey cases outwardly of the pressure chamber and onto a conveyor 20 from where the cartons E are advanced or conveyed to a position clear of the chamber. When cartons E are clear of chamber A, as detected by limit valve 6, rear door C is closed, and front door B opened placing chamber A in readiness for its next sequential test of cartons.

In accordance with the standard practices pertaining to pressure vessels, the chamber A of this invention is equipped with a safety valve 90, which valve is designed to prevent air pressure accumulating interior of the chamber A exceeding a predetermined limit.

Although the apparatus of this invention is equally functional with vacuum or pressure conditions, for convenience the remainder of this description will relate to detection during the application of external pressure.

Referring now to FIG. 2, which depects a method for accomplishing this invention, the operation of a pneumatic circuit sufficient for the practice of this invention is schematically illustrated. In such illustration it will be convenient to first set forth the sequence where no "dud" container is detected and thereafter the sequence where the presence of a "dud" container is detected.

In describing the operation of the schematic circuit of FIG. 2, reference will be made to valves 38, 46, and 60. These valves are illustrated as two-position pneumatic valves having generally one inlet and two outlets. Typically, valve blocks between the inlets and outlets are moved by a pressure impulse from various other portions of the circuit. When these pressure impulses are received, the valve block shifts as described in the following specification communicating the inlet to one or the other of the outlets.

Referring to FIG. 2, an air supply (not shown) is connected by line 23 to buttons P1 and P2 of dual hand start control 14. These buttons, connected in series for operation by both hands of the operator supply actuating air to the circuit and impart an actuating pulse through line 24 to the "forward" section of motor control 25. Simultaneously, an impulse is communicated to blue "test in progress" indicator 27 causing illumination of indicator 27 and concurrent extinguishment of indicator 28 through connected circuitry (not shown). Additionally, start control 14 functions to pass actuating air to the remainder of the circuit through air supply lines 30.

Motor 32, actuated by the "forward" section of start control 25 causes conveyors D and D' to move cartons E forwardly through belt and shaft drives 34 (shown in FIG. 1). When limit valve 3 senses the full entry of the conveyed cases E into chamber A, it actuates two functions through its connected line 36. First, a pressure signal is communicated to the "stop" section of conveyor control 25, stopping conveyor motor 32. Secondly, a pressure impulse is communicated to control block 26 to front door control valve 38. This control block shifts to a position where it registers inlet 29 between air supply 30 and line 39 to cylinder 40. Cylinder 40 supplied with actuating air through line 39, closes front door B.

Limit valve 2 detects closing of front door B. Valve 2 actuates two functions. First, through line 42, a pressure signal is communicated to bypass circuit 43. Bypass 43 functions to hold open an air passage across start control 14 permitting the operator to remove his hands from dual hand control 14. Secondly, through line 44, the flow of air into chamber A is initiated by shifting the control block of control valve 46 to a position where it permits the flow of air through line 47 from pressure reducing valve 48 to chamber A.

In operation, pressure reducing valve 48 is set to the maximum test pressure desired within chamber A. Air passes through pressure reducing valve 48 from air supply line 30 and interior of chamber A. Typically, flow of this air is throttled to provide within chamber A a gradual increase in pressure.

Once the chamber pressure begins to rise to a level such as 0.5 to 1 p.s.i.g., microphone G is energized. This occurs through closing of normally open, pressure closed circuit 50 connected between microphone G and its transducer 52. Circuit 50 maintains microphone G energized during that period of time that chamber A contains a positive level pressure above 0.5 to 1.0 p.s.i.g.

When the throttled inflow of air interior of chamber A has caused the pressure to reach the maximum desired state (typically in the range of 25 to 30 p.s.i.g.), the air pressure within chamber A is relieved. Maximum pressure sensor 55, through piping connected to chamber A, detects the presence of maximum test pressure within the chamber. Thereafter, this sensor communicates an impulse to the control block of chamber air control valve 46 to shift the block to the exhaust position. In this position of valve 46, piping F is registered with the exhaust port of valve 46. Air from chamber A discharges through a connected exhaust muffler provided for noise attenuation. Similar to the case where air is inflowed to chamber A, air outflowing from chamber A is throttled to provide for substantially gradual pressure reduction interior of the chamber.

Assuming no "dud" container is detected, when the pressure interior of chamber A approaches atmospheric, normally open pressured closed circuit 50 returns to the open position, interrupting the connection between microphone G and transducer 52. Thereafter, minimum pressure sensor 56 through line 57 detects when the chamber has reached substantially atmospheric pressure. Upon this detection, sensor 56 communicates a pressure signal to rear door control valve 60 through line 59. Control valve 60 has its control block shifted so as to provide an air passage from air supply line 30 through the valve to rear door opening piping 61. Air passing through piping 61 causes rear door control cylinder 62 to shift rear door C to the open position.

Once rear door C is in the open position, it triggers limit valve 5. Limit valve 5 provides a signal through line 64 to the "forward section" of conveyor control 25. Control 25 causes conveyor motor 32 to once again move conveyors D and D' forwardly conveying carton E out of chamber A and onto conveyor 20 (see FIG. 1).

When the cases have passed onto conveyor 20, they are advanced down the gradual slope of the conveyor until they make contact with limit valve 6. Valve 6 tripped by the mass of passing cartons E, simultaneously triggers two functions. First, through line 66, valve 6 causes conveyor control 25 to stop motor 32 and connected conveyors D and D'. Secondly, through line 68, valve 6 causes the control block of rear door control valve 60 to shift. This shift of the block causes air to be communicated from air supply line 30 to the bottom of cylinder 62 causing rear door C to close.

When rear door C closes, limit valve 4 detects such closure. This limit valve through a line 70 communicates a pressure signal to front door control valve 38. Valve 38 has its control block moved to the door open position and air flowing through front door opening piping 72 causes front door control cylinder 40 and connected front door B to move to the open position.

On movement of the front door to the open position, limit valve 7 is actuated. Valve 7, through connected line 73, effects two functions. First, bypass 43 has a pressure signal communicated thereto which closes the bypass. This signal closes down the actuating air supply across start control 14. Secondly, line 73 furnishes an impulse to the "ready for test" visual indicator 28 here shown as a green light. This indicator upon receiving an impulse turns off indicator 27 (through circuitry not shown) and emanates a visual signal indicating that the mechanism is ready to receive its next sequential cartons E for test.

The foregoing description has been made with the assumption that microphone G receives no impulse indicating the presence of a food container having unsatisfactory vacuum. Assuming that such a condition is detected, the operation of the schematic circuit illustrated in FIG. 2 will now be described.

When the pressure increase within chamber A causes a cover on a hermetically sealed container having insufficient vacuum to move from the convex to concave configuration, a distinctive clicking sound will emanate. This sound will be detected by microphone G. Microphone G, connected across the normally closed pressure opened switch 50 to transducer 52, will cause a pressure signal to be emitted from the transducer at lines 75 and 77 respectively. Line 76 will emanate a pulse to "dud container" visual indicator 26 (here shown as a red light) which will be illuminated, turning off the "test in progress" visual indicator 27 through circuitry (not shown). Simultaneously, line 77 will transmit a signal to test pressure control valve 46 causing this valve to shift immediately to the exhaust position. Additionally, a pressure impulse will be received at minimum pressure sensor 56 causing its outlet to be diverted from line 59 to line 80.

Chamber A will exhaust its pressurized air through air piping F. When the pressure within the chamber has reached a minimum level, minimum pressure sensor 56 through line 57 will detect this pressure level and communicate a pressure signal through line 80 instead of line 59. Line 80 will in turn communicate a pressure impulse to front door control valve 38.

Valve 38 through the shift of its control block will communicate air from inlet piping 30 to door opening piping 82 causing cylinder 40 to open front door B. Virtually simultaneously, line 80 at a second connection will actuate the "reverse" section of conveyor control 25 causing conveyor motor 32 to operate in reverse. Cartons E interior of chamber A will move on conveyors D and D' from the interior of the chamber A back along the original conveyed path through open front door B returning to the operator.

When cartons E have been conveyed clear of chamber A, they will actuate limit valve 8. Valve 8 through its line 86 will actuate the "stop" section of conveyor control 25. This will stop motor 32 arresting further conveyor motion. Substantially at the same time, front door B in moving to the open position will trigger limit valve 7. Valve 7 will close bypass circuit 43 and illuminate "ready for test" indicator 28 in the manner previously described. The machine is thus returned to a disposition where it is ready for its next sequential test.

Referring again to testing conducted while drawing a vacuum in chamber A, "vacuum grading" can be accomplished by subjecting the containers to a specific level of vacuum. Thus, if it is desired to grade out all containers having less than 5 inches Hg vacuum, a typical procedure would be to determine the amount of vacuum needed to hold the diaphragm in a concave (biased) position. Thereafter a vacuum slightly in excess of the difference between the diaphragm holding vacuum and the desired grade of vacuum within the containers would be externally applied.

The invention herein has been described schematically by use of a pneumatic circuit. It should be understood that other sequential controls, well known in the art (such as electrical, mechanical, and hydraulic) can all be used. Furthermore, where high quality control conditions are present, a chamber can be utilized that is of sufficient dimensions to receive a plurality of cartons such as would be stored, for example, on a shipping pallet. Thus, a rapid means is provided for simultaneously testing a large number of containers to ensure high quality product control. Likewise, these and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

I claim:

1. A method for testing hermetically sealed containers, each container having a pressure flexible diaphragm adapted to emit a detectable impulse when flexed by relative pressure changes between the inside and outside of said container, the steps of: providing a vessel having at least one sealable opening; conveying said entire container into said vessel through said opening; sealing said opening to said vessel; modifying the pressure within said vessel; detecting any emitted impulses within said vessel only when said pressure is varied interiorly thereof; providing a second opening from said vessel for egress of said container, and, conveying said container out of said second opening in said vessel.

2. A method in accordance with claim 1 wherein the internal vessel pressure is modified by increasing it above atmospheric.

3. A method in accordance with claim 2 wherein the increased pressure is released before said container is conveyed out of said opening.

4. A method in accordance with claim 3 wherein a partial vacuum is created in said vessel prior to increasing said pressure.

5. A method in accordance with claim 1 wherein said container tested is one of a plurality of containers enclosed in opaque, gas-pervious cartons.

6. Apparatus for testing a hermetically sealed container having a pressure actuatable diaphragm portion in at least one wall thereof, to indicate insufficient vacuum upon flexure of said diaphragm portion by external pressure changes upon said container, said apparatus comprising: a pressure vessel; conveyor means extending into said pressure vessel for conveying said container along a predetermined path; means for actuating said conveyor means for transporting said container into said pressure vessel; means for sealing said vessel when said container is therewithin; means for varying the pressure within said sealed vessel when said container is therewithin; means to detect sound emanating from said diaphragm portion within said vessel responsive to pressure changes within said vessel; and means responsive to said sound detecting means for diverting said container from said predetermined path.

7. The apparatus of claim 6 wherein said pressure varying means comprises vacuum drawing means and pressure increasing means actuatable in sequence.

8. The invention of claim 6 and wherein said sound detecting means is adapted to detect sound only when said pressure is varied within said sealed vessel.

9. The apparatus of claim 6 and wherein said sealing means includes first and second doors in the walls of said pressure vessel; and said conveyor means is adapted to transport said container into and out of said vessel.

10. The apparatus of claim 6 and wherein said diverting means includes means for reversing said conveyor means.

11. In combination: at least one container having a diaphragm included in at least one wall thereof for sound emanating flexure by pressure vessel; conveyor means extending into said pressure vessel; means for actuating said conveyor means for transporting said container into said pressure vessel; means for sealing said vessel when said container is therewithin; means for varying the pressure within said sealed vessel; and means to detect sound emanating from said diaphragm within said chamber only when pressure is varied within said sealed vessel.

12. The invention of claim 11 wherein said pressure varying means comprises vacuum drawing means and pressure increasing means actuatable in sequence.

13. The invention of claim 11 and wherein a plurality of said containers are transported simultaneously into said vessel for test.

14. The invention of claim 11 and including means for diverting said containers from said conveyed path, said diverting means operatively responsive to sound detected by said detecting means.

15. A method for testing hermetically sealed containers on a moving line of containers, each container having a pressure flexible diaphragm adapted to emit a detectable impulse should relative pressure changes between the inside and outside of said container cause flexing of said diaphragm, the steps of: moving a group of said containers to be tested to within a pressure sealable chamber; sealing said chamber; varying the pressure within said chamber containing said containers; detecting any emitted impulses within said sealed chamber while said pressure is varied therein; restoring the pressure within said chamber; removing said containers from said chamber; and separating those containers that emit said detected impulses from other of said containers.

* * * * *